July 25, 1933.                N. J. NOLAN                1,920,102
               ROLLER BEARING AND METHOD OF MAKING THE SAME
                        Filed May 23, 1932
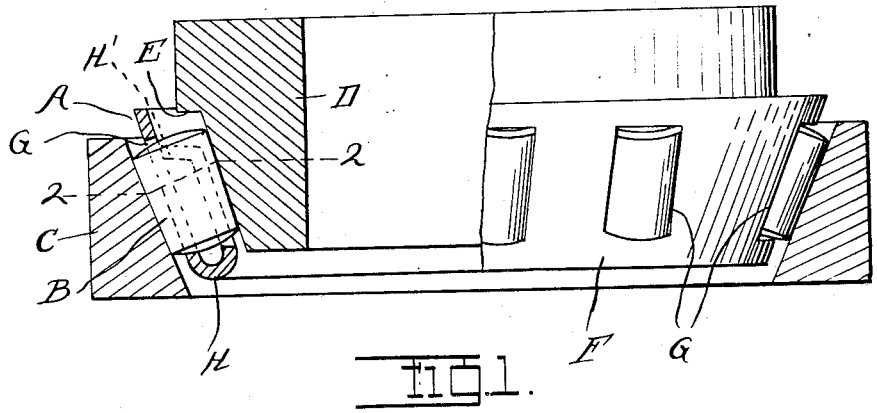
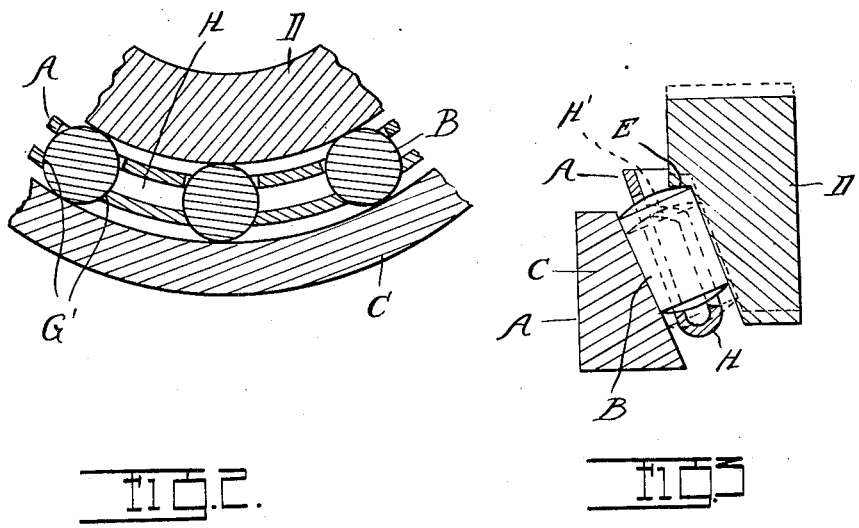
Inventor
Nicholas J. Nolan
By Whittemore Hulbert
   Whittemore & Belknap
              Attorneys Patented July 25, 1933

1,920,102

UNITED STATES PATENT OFFICE

NICHOLAS J. NOLAN, OF DETROIT, MICHIGAN, ASSIGNOR TO ADVANCE STAMPING COMPANY, OF DETROIT, MICHIGAN, A CORPORATION OF MICHIGAN

ROLLER BEARING AND METHOD OF MAKING THE SAME

Application filed May 23, 1932. Serial No. 613,044.

The invention relates to roller bearings of the type employing conical rolls to take care of both radial and end thrust. The present invention is in the nature of an improvement on a previous patent granted to me, No. 1,824,787, issued September 29, 1931. In the said prior patent the rolls are retained in spaced relation to each other by a cage which is formed from an integral sheet metal blank. This cage is provided with a conical annular portion having spaced apertures therein of a width slightly less than the diameters of the rolls and also provided with integral tongues extending upward from the small diameter end of said conical portion to extend between and bear against the inner faces of the rolls while outwardly extending portions at the ends of said tongues act as spacers for holding them in proper alignment. The construction is one which is simple and inexpensive to manufacture and which permits of easy assembly of the rolls with the cage.

In the use of such cage and roll assembly it is placed between conical race members, one of which is provided with an end thrust bearing for engaging the ends of the rolls so as to hold them from displacement. It has been found, however, that where this end thrust bearing is in initial contact with the ends of the rolls when the bearing is not under load, there is a tendency for the rolls to assume a skewed position where their axes are not properly aligned with the axis of the race members. This interferes with the proper functioning of the bearing and limits the life thereof. It is therefore the object of the present invention to overcome this defect and to this end the invention consists in the construction and method of forming the same as hereinafter set forth.

In the drawing:

Figure 1 is a sectional elevation of the roller bearing;

Figure 2 is a section substantially on line 2—2 of Figure 1;

Figure 3 is a diagram similar to a portion of Figure 1 showing in full and dotted lines the position of the rolls when first assembled and when under load.

The cage A for the rolls is formed from an integral sheet metal blank and the rolls B are assembled therewith as described in my prior patent above referred to. The parts are so proportioned that when the cage and roll assembly is placed in engagement with the conical race members C and D the large ends of the rolls will be out of contact with the end thrust shoulder E on the race member D. This is due to the fact that the circumferential length of the cage is slightly less than would be required to permit the cone D to move inward to a point where the shoulder E contacts with the rolls. If, however, sufficient end pressure is placed on the cone D this will force the rolls radially outward, pressing the same against the bearings on the cage and expanding the latter until the rolls are permitted to contact with the end bearing E. The resiliency of the material from which the cage is formed is sufficient to permit this expansion without exceeding the elastic limit and thus when the bearing is fully assembled there is a constant pressure of the bearing edges of the cage against each roll sufficient to hold it in alignment and to prevent any tendency to skew.

More in detail, the cage A has its conical portion F provided with spaced apertures G for receiving the rolls, the edges of these apertures being angled to be approximately tangent to the surface of the roll. The tongues H are then bent up on the inner side of the rolls having an outwardly bent spacer portion H' contacting with the portion F as described in my prior patent.

With the construction just described, when the cage and rolls are placed in engagement with the cone D they will be held with their large ends spaced from the shoulder E. To bring the ends of the rolls into contact with this shoulder it is necessary to move the rolls radially outward against the resistance of the portion F of the cage. However, as this cage is formed of resilient metal it will yield sufficiently to accomplish the purpose but in so doing will press the edge bearings G' at opposite sides of the apertures G into contact with the rolls and with sufficient pressure to insure proper alignment. Thus when the bearing is in operation under load the rolls A will be held by the cage in proper alignment where their axes prolonged would intersect with the axis of rotation of the bearing in a common point. As a consequence the bearing will have a much longer life than where there is any skewing of the rolls.

To effect the radial outward movement of the rollers and the expansion of the cage as above described, it is only necessary to assemble the parts as shown in Fig. 1, and to then apply an endwise pressure on the cone D simultaneous to the revolution of the same about its axis. This will cause the rolls B to travel upward on the cones C and D until the upper ends of the rolls contact with the shoulder E, which will limit further axial movement thereof. Such upward movement on the cones will simultaneously move the rolls radially outward which effects the expansion of the cage.

What I claim as my invention is:

1. In a roller bearing, the combination of a series of rolls having their axes converging to a common point, of a race member having a portion for receiving radial load from said rolls and a portion forming an end thrust bearing for the rolls, and a cage having bearings for engaging each of said rolls to align the same, said cage being so proportioned as to initially hold said rolls out of contact with said end thrust bearing whereby the contacting of said end thrust bearing with the rolls under load will place said aligning bearings under tension.

2. In a roller bearing, the combination with a series of rolls having their axes converging to a common point, of a race member for said rolls having a portion for receiving radial load and a portion for receiving end thrust from the rolls and a cage or retainer for the rolls comprising a conical annular member having spaced apertures therein of a width less than the diameter of the roll, said cage being so proportioned as to initially hold the rolls out of contact with said end thrust bearing and being resiliently yieldable to permit of contact under load and to simultaneously align the axes of the rolls.

3. In a roller bearing, the combination with a series of rolls having their axes converging to a common point, of a cage or retainer for said rolls comprising a conical annular member having spaced apertures therein of a width slightly less than the diameter of the rolls to form aligning bearings therefor on the outer side thereof, a conical race member for engaging the inner sides of said rolls and provided with an annular bearing for engaging the ends of the rolls, the said parts being so proportioned that said conical bearing will contact all of said rolls prior to the engagement of said annular bearing with the ends of the roll whereby movement of said rolls into contact with said annular bearing will place said aligning bearings under tension to hold the rolls from misalignment.

4. The method of forming a roller bearing which consists in mounting a series of rolls in a surrounding cage having aligning bearings for each roll, said cage being so proportioned as to hold the rolls slightly radially inward from their working position, assembling the rolls and cage with race members and in forcing the rolls radially outward by the pressure of the inner race member whereby said aligning bearings for each roll will be placed under tension.

NICHOLAS J. NOLAN.